US009790380B2

(12) United States Patent
Verheggen et al.

(10) Patent No.: US 9,790,380 B2
(45) Date of Patent: Oct. 17, 2017

(54) INK COMPOSITION (71) Applicant: OCE-TECHNOLOGIES B.V., Venlo (NL)

(72) Inventors: Michael T. J. Verheggen, Weert (NL); Roelof H. Everhardus, Lomm (NL); Antonius P. M. M. Van Roy, Grashoek (NL)

(73) Assignee: OCE-TECHNOLOGIES B.V., Venlo (NL)

(*) Notice: Subject to any disclaimer, the term of this patent is extended or adjusted under 35 U.S.C. 154(b) by 128 days.

(21) Appl. No.: 14/576,510

(22) Filed: Dec. 19, 2014

(65) Prior Publication Data
US 2015/0105504 A1 Apr. 16, 2015

Related U.S. Application Data (63) Continuation of application No. PCT/EP2013/061650, filed on Jun. 6, 2013.

(30) Foreign Application Priority Data

Jun. 20, 2012 (EP) .................... 12172763

(51) Int. Cl.
C09D 11/033 (2014.01)
C09D 11/10 (2014.01)
C09D 11/30 (2014.01)
C09D 11/38 (2014.01)
C09D 11/107 (2014.01)

(52) U.S. Cl.
CPC ............ C09D 11/033 (2013.01); C09D 11/10 (2013.01); C09D 11/107 (2013.01); C09D 11/30 (2013.01); C09D 11/38 (2013.01)

(58) Field of Classification Search
CPC ....... C09D 11/033; C09D 11/10; C09D 11/30; C09D 11/38; C09D 11/107
See application file for complete search history.

(56) References Cited

U.S. PATENT DOCUMENTS

| 3,385,816 A * | 5/1968 | Sawyer .................. C08G 18/10 524/757 |
| 5,629,365 A * | 5/1997 | Razavi ..................... C09D 5/32 524/145 |
| 6,869,986 B1 | 3/2005 | Millot et al. |
| 2008/0207820 A1* | 8/2008 | Brust ..................... C09D 11/40 524/507 |
| 2010/0028632 A1 | 2/2010 | Goustiaux et al. |

FOREIGN PATENT DOCUMENTS

| EP | 1 038 929 A1 | 9/2000 |
| JP | 6-306316 A | 11/1994 |
| JP | 2000-336293 A | 12/2000 |
| JP | 2008-37935 A | 2/2008 |

OTHER PUBLICATIONS

International Search Report, issued in PCT/EP2013/061650, dated Aug. 28, 2013.
Written Opinion of the International Searching Authority, issued in PCT/EP2013/061650, dated Aug. 28, 2013.
Japanese Notification of Reasons for Refusal for Japanese Application No. 2015-517662, dated Mar. 21, 2017, with a Machine translation.

* cited by examiner

Primary Examiner — Patrick Niland
(74) Attorney, Agent, or Firm — Birch, Stewart, Kolasch & Birch, LLP (57) ABSTRACT Disclosed is an aqueous ink composition including between 1 and 40 weight % of a water dispersible resin, between 0.5 and 15 weight % of a colorant, between 20 and 80 weight % of water and between 1 and 30 weight % of an acetal cosolvent, wherein all amounts are relative to the total ink composition. The ink composition may further include between 15 and 75 weight % of a dispersion stabilizing cosolvent.

16 Claims, 3 Drawing Sheets

INK COMPOSITION

This application is a Continuation of PCT International Application No. PCT/EP2013/061650, filed on Jun. 6, 2013, which claims priority under 35 U.S.C. 119(a) to Patent Application No. 12172763.0, filed in Europe on Jun. 20, 2012, all of which are hereby expressly incorporated by reference into the present application.

FIELD OF THE INVENTION

The present invention relates to an ink composition, suitable for use in an inkjet printing process.

BACKGROUND ART

EP 2 233 309 A2 discloses an ink composition containing water in an amount of 20-90 weight % based on the total weight of the ink, a pigment and a resin, which may be a water dispersed resin (i.e., a latex). WO 2011/021591 discloses an inkjet ink containing a water-dispersible colorant, a water-soluble organic solvent, a surfactant, a penetrant, water and preferably a water dispersible resin. Both mentioned prior art documents disclose methods for printing said inks onto media normally used in process printing or offset printing (e.g., machine coated (MC) or off-set coated media).

In a highly productive inkjet printing it is preferred to obtain (almost) instantly dry and robust prints, which can be handled at high speed and stay undamaged during transport from a printing module to further process equipment, for example to a fuser station in the printer.

A disadvantage, of known aqueous ink compositions is that they exhibit too low of a drying speed and/or require relatively high fuse energies to be suitably used in a highly productive inkjet printing process.

A disadvantage of known aqueous ink compositions comprising dispersed components (e.g., a dispersed resin and/or dispersed dyes or pigments) is that such ink compositions, in particular when used in highly productive inkjet printing, need to contain a substantial non-evaporating or hardly evaporating dispersion-stabilizing polar fraction (e.g., 20 weight % or more relative to the total ink composition) of water soluble organic cosolvents, usually aliphatic polyhydric alcohols having a relatively low vapor pressure to provide reliable jetting and cleaning behavior of the inkjet printing devices (print heads). Such a non-evaporating or hardly evaporating dispersion-stabilizing polar fraction may, depending on the nature of the medium to be printed on, have a negative influence on the drying speed of a print and/or the required fuse energy. It may therefore be beneficial to print quality and robustness to provide an ink composition having a more specific drying and/or fuse behavior. In particular, when intended to be used in a highly productive inkjet printing process, an ink composition having a higher drying speed and relatively low required fuse energy is preferred.

Alkylene or dialkylene glycol mono- and di-ethers (e.g., propylene glycol mono-methyl ether) are commonly used as a cosolvent in the ink formulations to tune the drying behavior, sometimes in combination with heating (~50° C.) of the medium during printing. However, the choice of suitable cosolvents from this class of glycol ethers is limited, partly because of high HS&E (i.e., Health, Safety and Environmental) risks.

It is therefore an object of the present invention to provide an aqueous ink composition having an improved drying and fuse behavior, without compromising the print quality and print robustness to an unacceptable extent.

It is another object of the present invention to provide an aqueous ink composition comprising dispersed components and having an improved drying and fuse behavior, without compromising the dispersion stability of the ink composition and the print quality and print robustness to an unacceptable extent.

It is yet another object of the present invention to provide an aqueous ink composition with low and in particular negligible HS&E risks.

SUMMARY OF THE INVENTION

These objects are at least partly achieved by providing an ink composition comprising:
  1-40 weight % of a water dispersible resin;
  0.5-15 weight % of a colorant;
  20-80 weight % water;
  1-30 weight % of an acetal cosolvent;
wherein all amounts are relative to the total ink composition.

A water dispersible resin may be added to the ink composition as a stable dispersion of the water dispersible resin in water. The stable dispersion of the water dispersible resin in water may also be termed a latex composition. An ink composition comprising a water dispersed resin may be termed a latex ink composition.

The colorant may be a dye, a pigment, a mixture of dyes, a mixture of pigments or a mixture of pigments and dyes. Preferably, the colorant comprises a water-dispersible colorant, more preferably, a water-dispersible pigment.

An acetal is a compound of which the molecules comprise two single-bonded oxygen atoms attached to the same carbon atom.

Inventors have surprisingly found that the class of acetal cosolvents, characterized by their compatibility with water comprised in the ink composition, are capable of significantly improving the drying and fuse behavior of the ink composition on a wide range of media, in particular, on hardly or non absorbing media such as machine coated (MC) media, without substantially compromising the print quality. The ink compositions according to the present invention may provide improved instant dryness and robustness of the prints.

Without wanting to be bound to any theory, it is thought that, depending on the chemical structure, the acetals may function as a penetrant (into absorbing media), or as an evaporation accelerator of water (via weakened Hydrogen bonding or azeotrope with water), or a combination of both.

Media-types intended to be printed on are the well-absorbing plain papers and inkjet coated media but also the slowly absorbing offset-coated media (also termed machine coated (MC) media) and even non-absorbing media such as films of PE, PP, PET, PVC or composites or mixtures thereof.

One characteristic of the use of a suitable acetal cosolvent is a faster (semi-dry) film formation of aqueous ink compositions, in particular aqueous pigmented latex ink compositions on the mentioned media, by a more complete and/or faster water removal by absorption and/or evaporation, already at ambient temperatures.

A potential additional advantage of acetal cosolvents is that they are in general eco-friendly co-solvents which are partly bio-based (i.e., may be derived from bio-feedstocks).

Latex ink compositions contain a water dispersed resin, which may primarily be used to improve the robustness of the printed image on a recording substrate. In order to provide an improved robustness to the printed image, the latex composition comprised in the ink composition must be able to form a film on the recording substrate. Therefore, the ink composition and in particular the latex composition must have a minimal film-forming temperature (MFFT) of below the temperature of the recording substrate during printing. It is therefore preferable to use latex compositions having a low, e.g., room temperature, MFFT. One potential disadvantage of this is that film formation might occur at the jetting temperature inside the inkjet printing device, in particular inside the nozzle orifices of the inkjet printing device, which may lead to clogging of the nozzle orifices and hence to a disturbance of the jetting process. For this reason a latex composition having an MFFT of above the jetting temperature is preferred.

One potential disadvantage of such a latex inkjet ink is that film formation on the recording substrate may need to be induced and/or assisted by heating the printed recording substrate. Thus, in general, by selecting and using a latex composition with a higher MFFT in an ink composition for improving the stability in the inkjet printing device, the energy consumption to fix (i.e., to fuse) the ink composition on the recording substrate increases. A separate fuser station may be required, which operates at elevated temperatures (above the MFFT of the ink composition) to obtain a desired robustness of the prints.

An ink composition according to the one embodiment containing a water dispersible resin and an acetal cosolvent may show an improved drying behavior and a reduced energy consumption for fixing (fusing) the ink to the recording substrate.

In an embodiment, the MFFT of the latex composition is above the jetting temperature, in particular above 30° C., preferably between 35° C. and 95° C., more preferably between 40° C. and 90° C.

In an embodiment, the water-dispersible resin has a glass transition temperature ($T_g$) of above 30° C., preferably between 50° C. and 120° C., more preferably between 60° C. and 100° C. The $T_g$ of the water dispersible resin determines the MFFT of the latex composition to a large extent. In general, the higher the $T_g$ of the dispersed resin is, the higher the MFFT of the latex composition will be. However, in the presence of an acetal cosolvent according to the present invention, the MFFT of the latex composition comprising a resin having a relatively high $T_g$ may be significantly reduced. A potential advantage of this is that film formation and fusing the printed image to the recording substrate may occur at relatively mild temperature conditions, thus showing reduced energy consumption, while the robustness of the print is not substantially compromised.

Without wanting to be bound to any theory, it is believed that besides the absorption and/or evaporation enhancing effect as described above, the acetal cosolvent may function as a plasticizer for the water-dispersible resin to a certain extent. The plasticizing effect results in a decrease of the MFFT of the latex composition comprising a water dispersible resin having a relatively high $T_g$ (e.g., above 70° C.) and hence in a reduced energy consumption for fixing (fusing) the ink to the recording substrate. Once the ink has been fixed to the recording substrate there is no significant difference in robustness compared to an ink composition comprising a water dispersible resin having a similar $T_g$ in the absence of the acetal cosolvent.

In an embodiment, the ink composition comprises 1-75 weight % of an additional cosolvent, preferably a dispersion stabilizing cosolvent, in particular a water soluble organic solvent.

In such embodiment, the dispersion stabilizing cosolvent and the acetal cosolvent are selected such that both are compatible with water and with each other.

In an embodiment, the ink composition comprises a surfactant in an amount of between 0.01 weight % and 3 weight % relative to the total ink composition. One or more surfactants may be added to an ink composition to tune the surface tension of the ink composition in order to improve the jet stability and/or the wettability of the surface of a recording medium. Improved wettability may improve spreading of an ink droplet on the surface of an image receiving substrate which may result in an improved image density and color saturation of the image formed and may reduce white spots in the printed image.

In an embodiment, the acetal cosolvent is selected from the group consisting of: glycerol-formal (i.e. a mixture of 5-hydroxy-1,3-dioxane and 4-hydroxymethyl-1,3-dioxolane); Bis(2-methoxy-ethoxy)methane (also termed: 2,5,7,10-Tetra-oxa-undecane: TOU); 1,3-dioxolane; alkyl-acetals and a combination of the plural.

In an embodiment, glycerol-formal; Bis(2-methoxy-ethoxy)methane (2,5,7,10-Tetra-oxa-undecane: TOU) and 1,3-dioxolane are preferably present in an amount of between 1 weight % and 20 weight %, preferably between 2 weight % and 15 weight %, more preferably between 3 weight % and 10 weight % relative to the total ink composition.

In an embodiment, 1,3-dioxolane is preferably present in an amount of between 1 weight % and 10 weight %, preferably between 2 weight % and 10 weight %, more preferably between 3 weight % and 8 weight % relative to the total ink composition.

In an embodiment, the acetal cosolvent may be an alkyl-acetal selected from the group consisting of: methylal, ethylal and butylal. The alkyl-acetal may be present in an amount of between 1 weight % and 10 weight %, preferably between 3 weight % and 10 weight %, more preferably between 5 weight % and 8 weight % relative to the total ink composition.

In an embodiment, the acetal cosolvent is an ether acetal, preferably a diether acetal.

In an embodiment, the acetal cosolvent is a linear ether acetal or a linear diether acetal.

In an embodiment, the acetal cosolvent has a molecular structure in accordance with Formula 1

$$R_1-O-R_2-O-CH_2-O-R_3-O-R_4 \qquad \text{Formula 1}$$

wherein:

$R_1$ and $R_4$ are independently of one another selected from the group consisting of —H, $C_1$-$C_6$ monovalent alkyl groups, which may be branched or linear, in particular —$CH_3$, —$C_2H_5$, and —$C_3H_7$;

$R_2$ and $R_3$ are independently of one another selected from the group consisting of $C_2$-$C_6$ alkyl divalent groups, which may be branched or linear, in particular —$C_2H_4$—, —$C_3H_6$—, —$C_4H_8$—.

In an embodiment, the acetal cosolvent is Bis(2-methoxy-ethoxy)methane (also termed: 2,5,7,10-Tetra-oxa-undecane: TOU).

BRIEF DESCRIPTION OF THE DRAWINGS

The present invention will become more fully understood from the detailed description given herein below and accompanying schematical drawings which are given by way of illustration only and are not limitative of the invention, and wherein.

DETAILED DESCRIPTION

Ink Composition

An ink composition according to the present invention comprises a solvent, in particular water; a colorant, preferably a water-dispersible colorant, a water-dispersible resin and an acetal cosolvent. The ink composition may optionally comprise an additional cosolvent, preferably at least one dispersion stabilizing cosolvent. In the context of the present invention the term cosolvent should be interpreted broadly: a cosolvent may comprise liquid cosolvents and/or water soluble (solid) compounds, in particular, water soluble (solid) compounds having a dispersion stabilizing effect when solved in water. The ink composition may further comprise a surfactant and optionally other additives. The components of the inks will be described in detail in the next sections.

Solvent

Water is cited as an environmentally friendly and hence desirable solvent. In the present invention, the content of water to the whole ink is preferably from 20 weight % to 80 weight %. It is more preferable that the content of water is from 30 weight % to 75 weight %, even more preferable from 40 weight % to 70 weight %.

Colorant

In the inkjet ink according to the present invention, a colorant, preferably a water-dispersible colorant, is present. The colorant may be a dye, a pigment, a mixture of dyes, a mixture of pigments or a mixture of pigments and dyes. A pigment (preferably water dispersible) may be primarily used as a water-dispersible colorant in view of the weatherability, and, for the purpose of controlling color tone; a dye may be contained within the range not impairing the weatherability. The pigment is not particularly limited and may be suitably selected in accordance with the intended use.

Examples of the pigment usable in the present invention include those commonly known without any limitation. For example, an organic pigment such as an insoluble pigment or a lake pigment, as well as an inorganic pigment such as carbon black, may be used.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination.

As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101(colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (C.I. Pigment Black 7) or metal-based pigments (e.g., copper, iron (C.I. Pigment Black 11), and titanium oxide; and organic pigments (e.g., aniline black (C.I. Pigment Black 1).

The average particle diameter (D50) of the water-dispersible pigment is preferably from 0.01 μm (10 nm) to 0.25 μm (250 nm), more preferably from 20 nm to 200 nm, and it is still more preferably from 40 nm to 150 nm in the inkjet ink in view of the dispersion stability and ejection reliability.

The amount of the water-insoluble pigment contained in the inkjet ink, as a solid content, is preferably 0.5 weight % to 15 weight % based on the total weight of the ink, more preferably 0.8 weight % to 10 weight %, and even more preferably between 1 weight % and 6 weight %. When the amount of the water-insoluble pigment is less than 0.5 weight %, the color developing ability and image density of the ink may degrade. When it is more than 15 weight %, unfavorably, the viscosity of the ink may be increased, causing degradation in ink ejection stability.

Water Dispersible Resin (Latex Resin)

The inkjet ink according to the present invention contains a water-dispersible resin in view of the pigment fixability to recording media. As the water-dispersible resin, a water-dispersible resin excellent in one or more of film formability (image formability) and having one or more of high water repellency, high waterfastness, and high weatherability is useful in recording images having high waterfastness and high image density (high color developing ability).

Examples of the water-dispersible resin include synthetic resins and natural polymer compounds.

Examples of the synthetic resins include polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, styrene-butadiene copolymer resins, and combinations of the plural.

Examples of the natural polymer compounds include celluloses, rosins, and natural rubbers.

Examples of commercially available water-dispersible resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon. Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.), acrylic copolymer emulsions of DSM Neoresins, e.g. the NeoCryl product line, in particular acrylic styrene copolymer emulsions NeoCryl A-662, NeoCryl A-1131, NeoCryl A-2091, NeoCryl A-550, NeoCryl BT-101, NeoCryl SR-270, NeoCryl XK-52, NeoCryl XK-39, NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, NeoCryl BT-24, NeoCryl BT-26, NeoCryl BT-26, NeoCryl XK-15, NeoCryl X-151, NeoCryl XK-232, NeoCryl XK-234, NeoCryl XK-237, NeoCryl XK-238-NeoCryl XK-86, NeoCryl XK-90 and NeoCryl XK-95. However, the water-dispersible resin emulsion is not limited to these examples.

The water-dispersible resin may be used in the form of a homopolymer, a copolymer or a composite resin, and all of water-dispersible resins having a monophase structure or core-shell structure and those prepared by power-feed emulsion polymerization may be used.

The content of the water-dispersible resin added in the ink of the present invention is preferably from 1-40 weight % based on the total weight of the ink, and it is more preferably from 1.5-30 weight %, and it is still more preferably from 2-25 weight %. Even more preferably, the amount of the water-dispersible resin contained in the inkjet ink, as a solid content, is 2.5 weight % to 15 weight %, and more preferably 3 weight % to 7 weight %, relative to the total ink composition.

The average particle diameter (D50) of the water-dispersible resin is preferably from 10 nm-1 μm, it is more preferably from 10-500 nm, and it is still more preferably from 20-200 nm, and especially preferably it is from 50-200 nm. In addition, there are no specific restrictions to the particle size distribution of the polymer particles, and it is possible that the polymer particles have a broad particle size distribution or the polymer particles have a particle size distribution of monodisperse type.

In an embodiment, the ink composition according to the present invention comprises two or more water-dispersible resins selected from the above cited synthetic resins, synthetic copolymer resins and natural polymer compounds in admixture with each other.

Acetal Cosolvent

An ink composition according to the present invention comprises an acetal cosolvent. Suitable examples of acetal cosolvents are: glycerol-formal (i.e. a mixture of 5-hydroxy-1,3-dioxane and 4-hydroxymethyl-1,3-dioxolane); Bis(2-methoxy-ethoxy)methane (also termed: 2,5,7,10-Tetra-oxa-undecane: TOU); 1,3-dioxolane; alkyl-acetals, like methylal, ethylal and butylal.

The acetal cosolvents may be used alone or in a combination of the plural.

Glycerol-formal; Bis(2-methoxy-ethoxy)methane (2,5,7, 10-Tetra-oxa-undecane: TOU) and 1,3-dioxolane are preferably present in an amount of between 1 weight % and 20 weight %, preferably between 2 weight % and 15 weight %, more preferably between 3 weight % and 10 weight % relative to the total ink composition.

1,3-dioxolane is preferably present in an amount of between 1 weight % and 10 weight %, preferably between 2 weight % and 10 weight %, more preferably between 3 weight % and 8 weight % relative to the total ink composition.

Alkyl-acetals like methylal, ethylal and butylal are preferably present in an amount of between 1 weight % and 10 weight %, preferably between 3 weight % and 10 weight %, more preferably between 5 weight % and 8 weight % relative to the total ink composition.

Optional Additional Cosolvent

As a solvent of the ink, for the purposes of improving the ejection property of the ink or adjusting the ink physical properties, the ink optionally, but preferably contains an additional cosolvent, preferably a dispersion stabilizing cosolvent, in particular a water soluble organic solvent in addition to water. As long as the effect of the present invention is not damaged, there is no restriction in particular in the type of the water soluble organic solvent.

Examples of the water-soluble organic solvent include polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate and ethylene carbonate.

Examples of the additional cosolvent include: glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, petaerythritol ethoxylate, polyethylene glycol (di)methylethers preferably having a molecular weight of between 200 gram/mol and 1000 gram/mol, tri-methylol-propane, diglycerol (diglycerin), trimethylglycine (betaine), N-methylmorpholine N-oxide, decaglyserol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol mono-propyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol mono-butyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol-monoethyl ether acetate, 1,2-hexanediol, 1,2-pentanediol and 1,2-butanediol.

Specific examples of the polyhydric alcohols include dipropylene glycol, 1,5-pentanediol, 3-methyl-1,3-butanediol, propylene glycol, 2-methyl-2,4-pentanediol, ethylene glycol, tripropylene glycol, hexylene glycol, polyethylene glycol, polypropylene glycol, 1,6-hexanediol, 1,2,6-hexanetriol, trimethylolethane and trimethylolpropane.

Examples of the polyhydric alcohol alkyl ethers include ethylene glycol monoethylether, ethylene glycol monobutylether, diethylene glycol monomethylether, diethylene glycol monoethylether, diethylene glycol monobutylether, ethylene glycol mono-2-ethylhexylether and propylene glycol monoethylether.

Examples of the polyhydric alcohol aryl ethers include ethylene glycol monophenyl ether and ethylene glycol monobenzyl ether.

Examples of the nitrogen-containing heterocyclic compounds include 2-pyrrolidone, N-methyl-2-pyrrolidone, 1,3-dimethyl-2-imidazolidionone, ε-caprolactam, and γ-butyrolactone.

Examples of the amides include formamide, N-methylformamide, N,N-dimethylformamide, and N,N-diethylformamide.

Examples of the amines include monoethanolamine, dimethanolamine, triethanolamine, N,N-dimethylmonoethanolamine, N-methyldiethanolamine, N-methylethanolamine, N-phenylethanolamine, 3-aminopropyl diethylamine, N-ethyldiethanolamine, N,N-diethylmonoethanolamine, tripropanolamine, 2-amino-2-methyl-1-propanol, N-ethyl-monoethanolamine, N,N-di-n-butylmonoethanolamine, di-isopropanolamine, N-n-butylmonoethanolamine, N-n-butyldiethanolamine and diglycolamine.

Examples of the sulfur-containing compounds include dimethylsulfoxide, sulfolane and thiodiglycol.

In an embodiment, a mixture of the water-soluble organic solvents may be comprised in an ink composition according to the present invention. The individual organic solvents preferably being present in an amount of 1 weight % to 50 weight %, more preferably in an amount of 1 weight % to 40 weight %, even more preferably in an amount of 1 weight % to 25 weight %, relative to the total ink composition.

The total amount of the water-soluble organic solvent contained in the ink composition is not particularly limited. It is, however, preferably 1 weight % to 75 weight %, and more preferably 10 weight % to 70 weight %, and even more preferably 15 weight % to 60 weight % with respect to the total ink composition. When the amount of the water-soluble organic solvent is more than 80 weight %, the drying times of the ink compositions may be too long. When the amount is less than 10 weight %, water in the ink compositions may evaporate more quickly, which may significantly reduce the stability of the ink composition.

Optional Surfactant

An ink composition according to the present invention may optionally comprise one or more surfactant. Examples of surfactants are not specifically limited. The following can be cited.

Examples of the surfactant include nonionic surfactants, cationic surfactants, anionic surfactants, amphoteric surfactants, in particular betaine surfactants, silicone surfactants, and fluorochemical surfactants. Particularly, at least one selected from acetylene surfactants, silicone surfactants and fluorochemical surfactants capable of reducing the surface tension to 30 mN/m or lower is preferably used.

Examples of a cationic surfactant include: aliphatic amine salts, aliphatic quaternary ammonium salts, benzalkonium salts, benzethonium chloride, pyridinium salts, imidazolinium salts.

Examples of an anionic surfactant include: polyoxyethylene alkylether acetic acid salts, dodecylbenzene sulfonic acid salts, lauric acid salts, and salts of polyoxyethylene alkylether sulfate, an aliphatic acid soap, an N-acyl-N-methyl glycin salt, an N-acyl-N-methyl-β-alanine salt, an N-acylglutamate, an acylated peptide, an alkylsulfonic acid salt, an alkylbenzenesulfonic acid salt, an alkylnaphthalenesulfonic acid salt, a dialkylsulfo succinate (e.g., sodium dioctyl sulfosuccinate (DSS); alternative names: docusate sodium, Aerosol OT and AOT), alkylsulfo acetate, α-olefin sulfonate, N-acyl-methyl taurine, a sulfonated oil, a higher alcohol sulfate salt, a secondary higher alcohol sulfate salt, an alkyl ether sulfate, a secondary higher alcohol ethoxysulfate, a polyoxyethylene alkylphenyl ether sulfate, a monoglysulfate, an aliphatic acid alkylolamido sulfate salt, an alkyl ether phosphate salt and an alkyl phosphate salt. Examples of an amphoteric surfactant include: a carboxybetaine type, a sulfobetaine type, an aminocarboxylate salt and an imidazolium betaine.

Examples of a nonionic surfactant include: polyoxyethylene alkylether, polyoxypropylene polyoxyethylene alkylether, a polyoxyethylene secondary alcohol ether, a polyoxyethylene alkylphenyl ether, a polyoxyethylene sterol ether, a polyoxyethylenelanolin derivative polyoxyethylene polyoxypropylene alkyl ether, polyoxyethylene alkylester, a polyoxyethyleneglycerine aliphatic acid ester, a polyoxyethylene castor oil, a hydrogenated castor oil, a polyoxyethylene sorbitol aliphatic acid ester, a polyethylene glycols aliphatic acid ester, an aliphatic acid monoglyceride, a polyglycerine aliphatic acid ester, a sorbitan aliphatic acid ester, polyoxyethylene sorbitan aliphatic ester, a propylene glycol aliphatic acid ester, a cane sugar aliphatic acid ester, an aliphatic acid alkanol amide, polyoxyethylene alkylamide, a polyoxyethylene aliphatic acid amide, a polyoxyethylene alkylamine, an alkylamine oxide, an acetyleneglycol, an ethoxylated acetylene glycol, acetylene alcohol.

Examples of the nonionic fluorochemical surfactants include perfluoroalkyl phosphoric acid ester compounds, perfluoroalkyl ethylene oxide adducts, and polyoxyalkylene ether polymer compounds having perfluoroalkyl ether groups as side chains. Among these, polyoxyalkylene ether polymer compounds having perfluoroalkyl ether groups as side chains are preferable because they are low in foaming property.

As the fluorochemical surfactants, commercially available products may be used. Examples of the commercially available products include SURFLON S-HI, S-112, S-113. S-121, S-131, S-132, S-141 and S-145 (all of which are produced by Asahi Glass Co., Ltd.), FLUORAD FC-93, FC-95, FC-98, FC-129, FC-135, FC-170C, FC-430 and FC-431 (all of which are produced by Sumitomo 3M Limited), MEGAFAC F-470, F-1405 and F-474 (all of which are produced by Dainippon Ink Chemical Industries Co., Ltd.), ZONYL TBS, FSP, FSA, FSN-100, FSN, FSO-100, FSO, FS-300 and UR (all of which are produced by E. I. du Pont de Nemours and Company), FT-110, FT-250, FT-251, FT-400S, FT-150 and FT-400SW (all of which are produced by Neos Company Limited), and POLYFOX PF-136A, PF-156A, PF-151N, PF-154, and PF-159 (all of which are produced by OMNOVA Solutions Inc.). Among these, ZONYL FS-300 (produced by E. I. du Pont de Nemours and Company), FT-110, FT-250, FT-251, FT-400S, FT-150, FT-400SW (produced by Neos Company Limited), and POLYFOX PF-151N (produced by OMNOVA Solutions Inc.) are preferable in that they are excellent in print quality, particularly in color developing ability and in dye-leveling property.

The silicone surfactant is not particularly limited and may be suitably selected in accordance with the intended use.

Examples of the silicone surfactant include side-chain-modified polydimethylsiloxane, both-ends-modified polydimethylsiloxane, one-end-modified polydimethylsiloxane, and side-chain/both-ends-modified polydimethylsiloxane. Polyether-modified silicone surfactants having, as a modified group, a polyoxyethylene group or a polyoxyethylene polyoxypropylene group are particularly preferable because they exhibit excellent physical properties as water-based surfactants. The silicone surfactant may be suitably synthesized or commercial products may be used. The commercial product is readily available from BYK Chemie GmbH, Shin-Etsu Chemical Co., Ltd., TORAY Dow Corning Silicone Co., Ltd., Nihon Emulsion Co., Ltd., Kyoeisha Chemical Co., Ltd., or the like.

As the polyether-modified silicone surfactant, commercial products may be used. Examples of the commercial products include KF-618, KF-642 and KF-643 (produced by Shin-Etsu Chemical Co., Ltd.); EMALEX-SS-5602 and SS-1906EX (produced by Nihon Emulsion Co., Ltd.); FZ-2105, FZ-2118, FZ-2154, FZ-2161, FZ-2162, FZ-2163 and FZ-2164 (produced by TORAY Dow Corning Silicone Co., Ltd.); and BYK-33, BYK 331, BYK 341, BYK 348, BYK 349, BYK 3455, BYK-387 (produced by BYK Chemie GmbH); Tegowet 240, Tegowet 245, Tegowet 250, Tegowet 260 (produced by Evonik); Silwet L-77 (produced by Sabic).

In an embodiment, a surfactant may be selected from the group consisting of dialkyl sulfosucinate salts, such as sodium dioctyl sulfosuccinate (AOT), ethoxylated acetylene glycols like Dynol 607 (Air Products) and combinations thereof.

Specific examples of ethoxylated acetylene glycols are ethoxylated 3-methyl-1-nonyn-3-ol, ethoxylated 7,10-dimethyl-8-hexadecyne-7,10-diol, ethoxylated 4,7-dimethyl-5-decyne-4,7-diol, ethoxylated 2,4,7,9-tetramethyl-5-decyne-4,7-diol, and ethoxylated 2,5,8,11-tetramethyl-6-dodecyne-5,8-diol. These can be used in combination with each other.

All surfactants mentioned in this section may be used solely, or they may be used in combination of the plural.

Receiving Media

Suitable receiving media for use in a printing process using an ink or set of inks (Cyan, Magenta, Yellow and blacK, CMYK) according to the present invention are not particularly limited to any type. The receiving medium may be suitably selected depending on the intended application.

Suitable receiving media may range from strongly water absorbing media such as plain paper (for example, Océ Red Label) to non-water-absorbing media such as plastic sheets (for example, PE, PP, PVC and PET films). To optimize print quality, inkjet coated media are known, which media comprise a highly water absorbing coating.

Of particular interest in the context of the present invention are Machine Coated (MC) media (also known as offset coated media) and glossy (coated) media. MC media are designed for use in conventional printing processes, for example offset printing and show good absorption characteristics with respect to solvents used in inks used in such printing processes, which are usually organic solvents. MC and glossy media show inferior absorption behavior with respect to water (worse than plain paper, better than plastic sheets), and hence aqueous inks.

Machine coated or offset coated media comprise a base layer and a coating layer. The base layer may be a sheet of paper mainly made of wood fibers or a non-woven fabric material comprising wood fibers combined with synthetic fibers. The base layer may be made of wood pulp or recycled paper pulp and may be bleached. The base layer may comprise an internal filler, for example a conventional white pigment such as precipitated calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithophone, zeolite, magnesium carbonate, or magnesium hydrate.

The base layer may comprise an internal sizing agent used when producing the base, for example a neutral rosin size used for neutral papermaking, alkenyl succinic anhydride (ASA), alkyl ketene dimer (AKD), or a petroleum resin size may be used.

The thickness of the base is not particularly limited and may be suitably selected in accordance with the intended use. It is, however, preferably 50 µm to 300 µm. The basis weight of the base is preferably 45 g/m$^2$ to 290 g/m$^2$.

The coating layer may comprise a (white) organic and/or inorganic pigment, a binder and may further contain a surfactant and other components as required.

Examples of the inorganic pigment include kaolin, talc, calcium bicarbonate, light calcium carbonate, calcium sulfite, amorphous silica, titanium white, magnesium carbonate, titanium dioxide, aluminum hydroxide, calcium hydroxide, magnesium hydroxide, zinc hydroxide and chlorite.

Examples of the organic pigment include (aqueous) dispersions of, for example, styrene-acrylic copolymer particles, styrene-butadiene copolymer particles, polystyrene particles or polyethylene particles.

The binder preferably comprises an aqueous resin such as polyvinyl alcohol and polyvinyl alcohol modification products such as anion-modified polyvinyl alcohol, cation-modified polyvinyl alcohol or acetal-modified polyvinyl alcohol; polyurethane; polyvinyl pyrrolidone and polyvinyl pyrrolidone modification products such as copolymers of polyvinyl pyrrolidone and vinyl acetate, copolymers of vinyl pyrrolidone and dimethylaminoethyl methacrylate, copolymers of quaternized vinyl pyrrolidone and dimethylaminoethyl methacrylate or copolymers of vinyl pyrrolidone and methacrylamide propyl trimethyl ammonium chloride; celluloses such as carboxymethyl cellulose, hydroxyethyl cellulose or hydroxypropyl cellulose; cellulose modification products such as cationized hydroxyethyl cellulose; synthetic resins such as polyester, polyacrylic acid (ester), melamine resin or modification products thereof or copolymers of polyester and polyurethane; and poly(meth)acrylic acid, poly(meth)acrylamide, oxidized starch, phosphoric acid-esterified starch, self-modifying starch, cationized starch, various types of modified starch, polyethylene oxide, sodium polyacrylate and sodium arginate. These water-soluble resins may be used alone or in combination.

Printing Process

Figure 1:
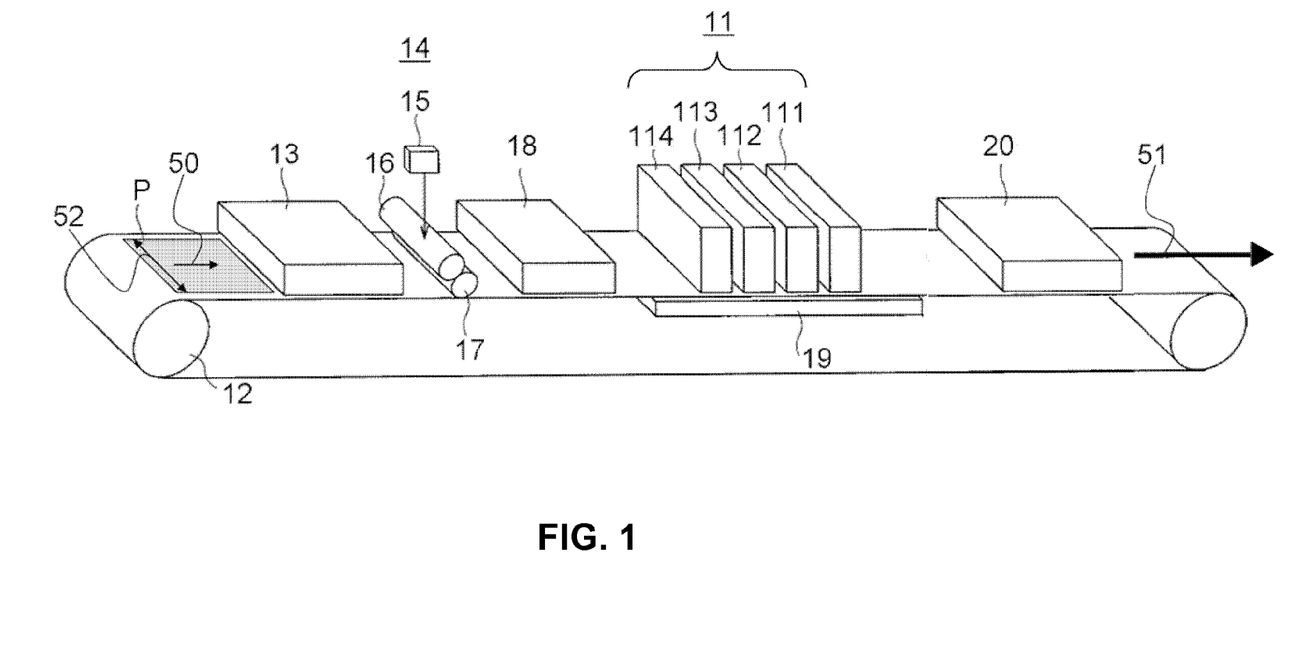
FIG. 1 shows a schematic representation of an inkjet printing system.
Figure 2A:
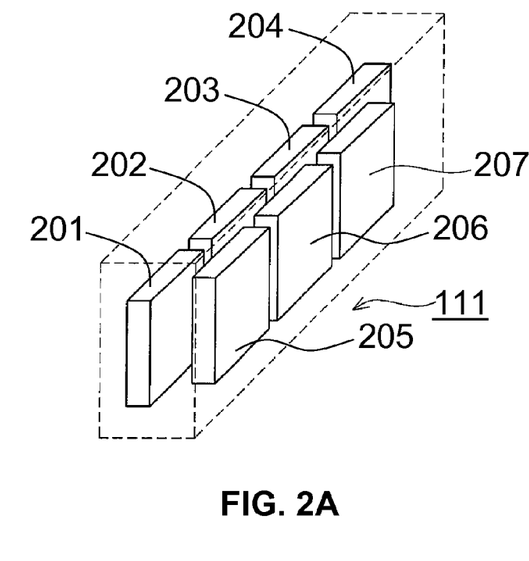
FIGS. 2A and 2B show schematic representations of an assembly of inkjet heads.
Figure 2B:
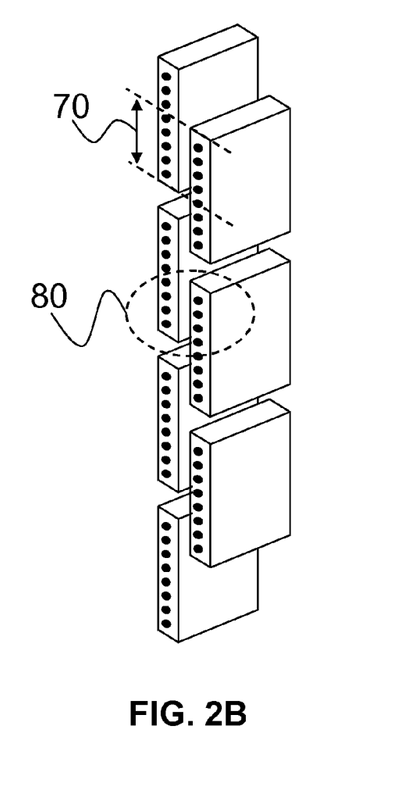

A printing process in which the inks according to the present invention may be suitably used is described with reference to the appended drawings shown in FIG. 1, FIG. 2A and FIG. 2B. FIGS. 1, 2A and 2B show schematic representations of an inkjet printing system (FIG. 1) and inkjet marking device (FIGS. 2A and 2B).

FIG. 1 shows that a sheet of a receiving medium, in particular a machine coated medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g., sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g., clamping) and vacuum fixation. Of these, vacuum fixation is preferred.

The printing process as described below comprises of the following steps: media pretreatment, image formation, drying and fixing and optionally post treatment.

Media Pretreatment

To improve the spreading and pinning (i.e., fixation of pigments and water-dispersed polymer particles) of the ink on the receiving medium, in particular on slow absorbing media, such as machine coated media, the receiving medium may be pretreated, i.e., treated prior to printing an image on the medium. The pretreatment step may comprise one or more of the following:

preheating of the receiving medium to enhance spreading of the used ink on the receiving medium and/or to enhance absorption of the used ink into the receiving medium;

primer treatment for increasing the surface tension of the receiving medium in order to improve the wettability of the receiving medium by the used ink and to control the stability of the dispersed solid fraction of the ink composition (i.e., pigments and dispersed polymer particles). Primer treatment may be performed in the gas phase, e.g., with gaseous acids such as hydrochloric acid, sulfuric acid, acetic acid, phosphoric acid and lactic acid, or in the liquid phase by coating the receiving medium with a primer solution. The primer solution may comprise water as a solvent, one or more cosolvents, additives such as surfactants and at least one compound selected from a polyvalent metal salt, an acid and a cationic resin;

corona or plasma treatment.

FIG. 1 shows that the sheet of receiving medium P may be conveyed to and passed through a first pretreatment module 13, which module may comprise a preheater (not shown), for example a radiation heater, a corona/plasma treatment unit, a gaseous acid treatment unit or a combination of any of the above. Optionally and subsequently, a predetermined quantity of the aqueous primer solution is applied on the surface of the receiving medium P at aqueous primer solution applying member 14. Specifically, the aqueous primer solution is provided from storage tank 15 of the aqueous primer solution to the aqueous primer solution applying member 14 composed of double rolls 16 and 17. Each surface of the double rolls 16 and 17 may be covered with a porous resin material such as sponge. After providing the aqueous primer solution to the auxiliary roll 16 first, the aqueous primer solution is transferred to the main roll 17, and a predetermined quantity is applied on the surface of the receiving medium P. Subsequently, the coated printing paper P on which the aqueous primer solution was applied may optionally be heated and dried by drying member 18 which is composed of a drying heater installed at the downstream position of the aqueous primer solution applying member 14 in order to decrease the quantity of the water content in the aqueous primer solution to a predetermined range. It is preferable to decrease the water content in an amount of 1.0 weight % to 30 weight % based on the total water content in the provided primer solution provided on the receiving medium P.

To prevent the transportation mechanism 12 from being contaminated with primer solution, a cleaning unit (not shown) may be installed and/or the transportation mechanism 12 may be comprised multiple belts or drums as described above. The latter measure prevents contamination of the upstream parts of the transportation mechanism, in particular of the transportation mechanism in the printing region.

Image Formation

Image formation is performed in such a manner that, employing an inkjet printer loaded with inkjet inks, ink droplets are ejected from the inkjet heads based on the digital signals onto a print medium.

Although both single pass inkjet printing and multi pass (i.e., scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a receiving medium underneath an inkjet marking module.

In FIG. 1, numeral 11 represents an inkjet marking module comprising four inkjet marking devices, indicated with 111, 112, 113 and 114, each arranged to eject an ink of a different color (e.g., Cyan, Magenta, Yellow and black). The nozzle pitch of each head is preferably about 360 dpi. In the present invention, "dpi" indicates a dot number per 2.54 cm.

An inkjet marking device for use in single pass inkjet printing, 111, 112, 113, 114, has a length, L, of at least the width of the desired printing range, indicated with double arrow 52, the printing range being perpendicular to the media transport direction, indicated with arrows 50 and 51. The inkjet marking device may comprise a single print head having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of print heads. FIG. 2A shows an inkjet marking device 111 (112, 113, 114 may be identical) comprising 7 individual inkjet heads (201, 202, 203, 204, 205, 206, 207) which are arranged in two parallel rows, a first row comprising four inkjet heads (201-204) and a second row comprising three inkjet heads (205-207) which are arranged in a staggered configuration with respect to the inkjet heads of the first row. The staggered arrangement provides a page wide array of nozzles which are substantially equidistant in the length direction of the inkjet marking device. The staggered configuration may also provide a redundancy of nozzles in the area where the inkjet heads of the first row and the second row overlap, see 70 or 80 in FIG. 2B.

In image formation by ejecting an ink, an inkjet head (i.e., print head) employed may be either an on-demand type or a continuous type inkjet head. As an ink ejection system, there may be usable either the electric-mechanical conversion system (e.g., a single-cavity type, a double-cavity type, a bender type, a piston type, a share mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 μm or less in the current image forming method.

FIG. 1 shows that after pretreatment, the receiving medium P is conveyed to upstream part of the inkjet marking module 11. Then, image formation is carried out by each color ink ejecting from each inkjet marking device 111, 112, 113 and 114 arranged so that the whole width of the receiving medium P is covered.

Optionally, the image formation may be carried out while the receiving medium is temperature controlled. For this purpose a temperature control device 19 may be arranged to control the temperature of the surface of the transportation mechanism (e.g. belt or drum) underneath the inkjet marking module 11.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected receiving medium.

FIG. 1 schematically shows a drying and fixing unit 20, which may comprise a heater (not shown), for example a radiation heater. After an image has been formed, the print is conveyed to and passed through the drying and fixing unit 20. The print is heated such that solvents present in the printed image, to a large extent water, evaporate. The speed of evaporation and hence drying may be enhanced by increasing the air refresh rate in the drying and fixing unit 20. Simultaneously, film formation of the ink occurs, because the prints are heated to a temperature above the minimum film formation temperature (MFFT). The residence time of the print in the drying and fixing unit 20 and the temperature at which the drying and fixing unit 20 operates are optimized, such that when the print leaves the drying and fixing unit 20 a dry and robust print has been obtained. As described above, the transportation mechanism 12 in the fixing and drying unit 20 may be separated from the transportation mechanism of the pretreatment and printing section of the printing apparatus and may comprise a belt or a drum.

Hitherto, the printing process was described such that the image formation step was performed in-line with the pretreatment step (e.g., application of an aqueous primer solution) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying an aqueous primer solution, the (optional) step of drying a coating solution, the step of ejecting an inkjet ink to form an image and the step or drying an fixing the printed image are performed. It is, however, preferable to carry out image formation with the above defined in-line image forming method.

EXAMPLES

Experimental and Measurement Methods

Fusing Experiments

Figure 3:
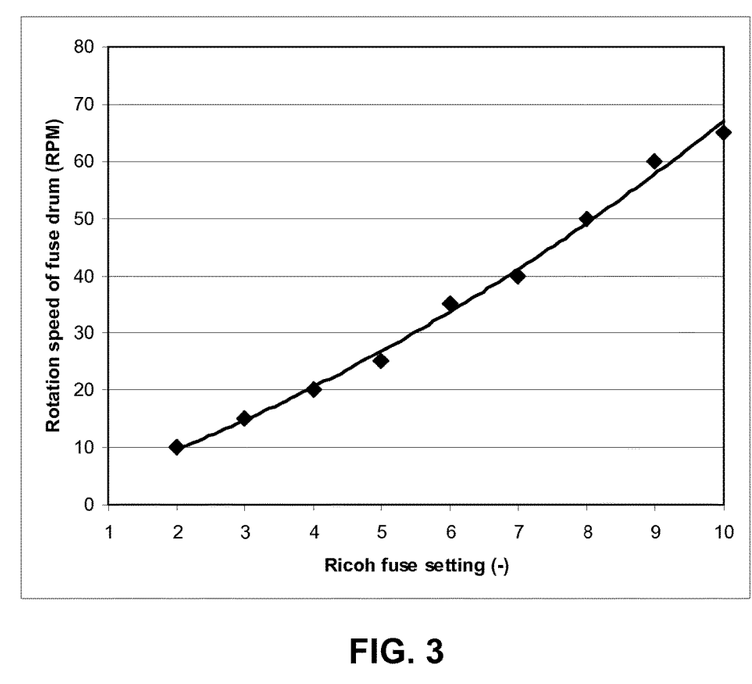
FIG. 3 shows a correlation between the Ricoh fuser settings and the rotational speed of the fuse drum incorporated in such a fuser.

Fusing experiments are performed with a Ricoh Fuser, model 592 of Ricoh company LTD. The Ricoh fuser comprises a rotatable drum (fuse drum) having a diameter of 20 cm and a page-wide Halogen fuse lamp having a power of approximately 750 W. The fuse lamp is arranged at a position opposite to the fuse drum at a distance of 3 cm. The Ricoh fuser can be operated at settings from 1 to 10. Each setting corresponds to a rotation speed of the fuse drum. FIG. 3 shows a correlation between the Ricoh fuse setting (x-axis) and the rotation speed of the fuse drum (y-axis), in revolutions per minute (RPM). The rotation speed of the fuse drum increases with an increasing Ricoh fuse setting. The exposure time to fuse radiation of a sheet of recording medium transported by the fuse drum decreases with an increasing Ricoh fuse setting, hence the applied fuse energy decreases with increasing Ricoh fuse setting. All fusing experiments performed with inks according to the present invention were performed under the same conditions.

Directly after fusing an ink image to a sheet of recording media, the ink layer is rubbed with a piece of plain paper (Océ Red label). The robustness of the print is judged based on the damage imparted to the ink layer and valued from 1 to 5, wherein:

5 represents an excellent print robustness: no damage imparted to the ink layer;

4 represents a good print robustness: some matting effect of the rubbed area;

3 represents a sufficient print robustness: minor visual damage imparted to the ink layer;

2 represents a weak print robustness: substantial visual damage imparted to the ink layer;

1 represents a bad print robustness: completely removed ink layer after rubbing.

Glass Transition Temperature ($T_g$)

The $T_g$ is determined according to ASTM E 1356-03 with differential scanning calorimetry and measured with a TA instruments Q2000. The prepared sample was heated at a rate of 10° C./min. The onset of the $T_g$ was determined during a second run (i.e., sample was heated and cooled first before starting the measurement). The $T_g$ is a secondary transition and can be determined by analyzing the deflection point of the DSC curve.

Minimum Film Forming Temperature (MFFT)

In the context of the present invention, latex compositions are selected based on their MFFT as specified by the supplier. The MFFT can be determined in accordance with ASTM D-2354, for example on a Sheen Instruments Ltd, MFFT bar SS-3000. The wet latex composition is cast on a bar or plate (depending on the apparatus configuration) with a pre-imposed an equilibrated temperature gradient and dry air flow. The MFFT is determined by visual observation of the transition point (temperature) at which the formed film changes from a turbid white and/or cracked film into a clear and coherent film.

Preparation of Ink Compositions

Comparative Example A 170 grams of NeoCryl A-662 latex (obtained from DSM, 40 weight % latex, the latex particles having an average particle diameter D50 of ±100 nm; the latex resin having a $T_g$ of 97° C. and a MFFT >90° C.), 285.7 grams of Pro-Jet Cyan APD 1000 pigment dispersion (14 weight % pigment dispersion, obtained from FujiFilm Imaging Colorants), 215 grams of PEG600 (obtained from Sigma Aldrich), 50 grams of 1,2-propanediol (obtained from Sigma Aldrich), 8.7 grams of Dynol 607 (obtained from Air Products), 3.5 grams of BYK 348 (obtained from BYK), 3.5 grams of Tegowet 240 (obtained from Sabic) and 263.6 grams of demineralized water were mixed in a vessel, stirred for approximately 60 minutes and filtered over a Pall Profile Star absolute glass filter having a pore size of 1 μm. The obtained ink composition is shown in Table 1.

This ink composition was used as a reference for the drying/curing behavior of the ink compositions comprising an acetal cosolvent as is demonstrated in examples 1-3.

Comparative Example B

The working method of Comparative Example A was repeated and Dipropylene Glycol Mono Methyl Ether (DPGME; obtained from Sigma Aldrich) was added in an amount of 3 wt % relative to the total ink composition. To maintain the viscosity of the ink composition comparable to the reference ink of comparative example A, the amount of DPGME was compensated for, by reducing the amount of water. The obtained ink composition is shown in Table 1.

Example 1

The working method of Comparative Example A was repeated and 2,5,7,10-tetra-oxa-undecane (TOU; manufactured by Lambiotte&Cie and obtained from ICS) was added in an amount of 3 wt % relative to the total ink composition. To maintain the viscosity of the ink composition comparable to the reference ink of comparative example A, the amount of the acetal (TOU in the present example) was compensated for, by reducing the amount of water. The obtained ink composition is shown in Table 1.

Examples 2-3

Example 1 was repeated. As the acetal cosolvent, TOU was substituted for Methylal (example 2) and Glycerol formal (example 3), respectively, both manufactured by Lambiote&Cie and obtained from ICS. The obtained ink compositions are shown in Table 1

Comparative Example C

The working method of Comparative Example A was repeated with NeoCryl A-1127 latex (obtained from DSM, 40 weight % latex, the latex resin having a $T_g$ at −13° C. and at 110° C. and a MFFT of 7° C.) instead of Neocryl A-662 latex. The obtained ink composition is shown in Table 1.

This ink composition was used as a reference for the drying/curing behavior of the ink compositions comprising an acetal cosolvent as is demonstrated in examples 4-6.

Examples 4-6

The working method of Comparative Example C was repeated and 2,5,7,10-tetra-oxa-undecane (TOU; example 4), Methylal (example 5) and Glycerol formal (example 6), respectively, were added in an amount of 3 wt % relative to the total ink composition. To maintain the viscosity of the ink composition comparable to the reference ink of comparative example A, the amount of the acetal was compensated for, by reducing the amount of water. The obtained ink compositions are shown in Table 1.

Comparative Example D

The working method of Comparative Example A was repeated with Carboset PC 27 latex (obtained from Lubrizol) instead of Neocryl A-662 latex. The Carboset PC 27 latex has a MFFT of about 90° C. The obtained ink composition is shown in Table 1.

This ink composition was used as a reference for the drying/curing behavior of the ink compositions comprising an acetal cosolvent as is demonstrated in example 7.

Example 7

The working method of Comparative Example D was repeated and 2,5,7,10-tetra-oxa-undecane (TOU) was added in an amount of 3 wt % relative to the total ink composition. To maintain the viscosity of the ink composition comparable to the reference ink of comparative example A, the amount of the acetal was compensated for, by reducing the amount of water. The obtained ink composition is shown in Table 1.

TABLE 1

Ink compositions of comparative examples A-D and examples 1-7. The amounts are in weight % relative to the total ink composition.

| compound | (A) | (B) | 1 | 2 | 3 | (C) | 4 | 5 | 6 | (D) | 7 |
|---|---|---|---|---|---|---|---|---|---|---|---|
| Latex [1] | | | | | | | | | | | |
| A-662 [2] | 6.8 | 6.8 | 6.8 | 6.8 | 6.8 | | | | | | |
| A-1127 [2] | | | | | | 6.8 | 6.8 | 6.8 | 6.8 | | |
| PC 27 [3] | | | | | | | | | | 6.8 | 6.8 |
| Pigment [1)4)] | 4 | 4 | 4 | 4 | 4 | 4 | 4 | 4 | 4 | 4 | 4 |
| Cosolvents | | | | | | | | | | | |
| PEG600 | 21.5 | 21.5 | 21.5 | 21.5 | 21.5 | 21.5 | 21.5 | 21.5 | 21.5 | 21.5 | 21.5 |
| 1,2 propanediol | 5 | 5 | 5 | 5 | 5 | 5 | 5 | 5 | 5 | 5 | 5 |
| DPGME | | 3 | | | | | | | | | |
| TOU [5] | | | 3 | | | | 3 | | | | 3 |
| Methylal [6] | | | | 3 | | | | 3 | | | |
| Glycerol formal [6] | | | | | 3 | | | | 3 | | |
| surfactants | | | | | | | | | | | |
| Dynol 607 | 0.87 | 0.87 | 0.87 | 0.87 | 0.87 | 0.87 | 0.87 | 0.87 | 0.87 | 0.87 | 0.87 |
| BYK 348 | 0.35 | 0.35 | 0.35 | 0.35 | 0.35 | 0.35 | 0.35 | 0.35 | 0.35 | 0.35 | 0.35 |
| Tegowet 240 | 0.35 | 0.35 | 0.35 | 0.35 | 0.35 | 0.35 | 0.35 | 0.35 | 0.35 | 0.35 | 0.35 |
| Water | 61.13 | 58.13 | 58.13 | 58.13 | 58.13 | 61.13 | 58.13 | 58.13 | 58.13 | 61.13 | 58.13 |
| total | 100 | 100 | 100 | 100 | 100 | 100 | 100 | 100 | 100 | 100 | 100 |

[1] The amount of latex and pigment is the amount of solids relative to the total ink composition
[2] DSM Neocryl series
[3] Lubrizol Carboset PC 27 latex
[4] Pro-jet Cyan APD 1000 pigment (FujiFilm Imaging Colorants)
[6] Acetal cosolvents according to the present invention Evaluation of Fuse Behavior/(Fuse) Energy Consumption Example 8

The inks according to comparative examples A-D and examples 1-7 were applied to machine coated media Hello Gloss (115 g/m$^2$) obtained from Hello, by rod coating an ink layer having a thickness of 8 μm. The wet rod coat samples were subjected to the Ricoh fuser as described above and treated at fuse settings of 4, 4.5, 5 and 5.5 corresponding to fuse drum rotational speeds of 20 RPM, 25 RPM, 30 RPM and 35 RPM, respectively.

The robustness of the ink layer on the substrate were determined according to the method as described above.

The results of this evaluation are summarized in Table 2.

TABLE 2

| | | | Results robustness[4] | | | |
|---|---|---|---|---|---|---|
| (comparative) example | latex | additional cosolvent[1] | Print robustness at Ricoh fuse setting 4 | Print robustness at Ricoh fuse setting 4.5 | Print robustness at Ricoh fuse setting 5 | Print robustness at Ricoh fuse setting 5.5 |
| (A) | A-662 [3] | — | 5 | 2 | 1 | 1 |
| (B) | A-662 [3] | DPGME | 5 | 4 | 3 | 2 |
| 1 | A-662 [3] | TOU | 5 | 5 | 5 | 4 |
| 2 | A-662 [3] | Methylal | 5 | 4 | 3 | 2 |
| 3 | A-662 [3] | Glycerol formal | 5 | 4 | 3 | 2 |
| (C) | A-1127 [3] | — | 3 | 3 | 2 | 2 |
| 4 | A-1127 [3] | TOU | 3 | 3 | 2 | 2 |
| 5 | A-1127 [3] | Methylal | 3 | 3 | 2 | 2 |
| 6 | A-1127 [3] | Glycerol formal | 3 | 3 | 2 | 2 |

TABLE 2-continued

Results robustness[4)]

| (comparative) example | latex | additional cosolvent[1)] | Print robustness at Ricoh fuse setting 4 | Print robustness at Ricoh fuse setting 4.5 | Print robustness at Ricoh fuse setting 5 | Print robustness at Ricoh fuse setting 5.5 |
|---|---|---|---|---|---|---|
| (D) | PC 27 [4)] | — | n.d. [2)] | 2 | 2 | 1 |
| 7 | PC 27 [4)] | TOU | n.d. [2)] | 5 | 5 | 4 |

[1)]All ink compositions comprised PEG600 (21.5 wt %) and 1,2-propanediol (5 wt %) as cosolvents
[2)] not determined
[3)] DSM Neocryl series [4)] Lubrizol Carboset series
[4)] Print robustness is rated from 1 to 5, wherein:
5 represents an excellent print robustness: no damage imparted to the ink layer;
4 represents a good print robustness: some matting effect of the rubbed area;
3 represents a sufficient print robustness: minor visual damage imparted to the ink layer;
2 represents a weak print robustness: substantial visual damage imparted to the ink layer;
1 represents a bad print robustness: completely removed ink layer after rubbing.

Table 2 shows that by adding an acetal cosolvent to an ink composition comprising a relatively high MFFT latex composition (compare examples 1-3 with comparative example A and example 7 with comparative example D) the required fuse energy for obtaining a robust ink layer, significantly reduces (i.e., at a lower fuse energy (higher Ricoh fuse setting) the print robustness in examples 1-3 is higher than the robustness in comparative example A).

At fuse settings 4.5 and 5 (corresponding to a rotational speed of the fuse drum of 25 RPM and 30 RPM, respectively) there are subtle differences in robustness level among the ink compositions according to examples 1-3 (e.g. comprising an acetal cosolvent) and comparative example B (comprising DPGME). The order of the robustness of the rod coat samples fused at said settings is as follows:
Example 1 (TOU)>>Comparative Example B (DPGME) >Example 3 (glycerol formal)>Example 2 (methylal)

Overall it can be concluded that the ink compositions comprising an acetal cosolvent show a robustness level comparable to the robustness level of an ink comprising DPGME and that in particular TOU shows an improved robustness level.

Table 2 also shows that by adding an acetal cosolvent to an ink composition comprising a relatively low MFFT latex composition (compare examples 4-6 with comparative example C, there is no significant influence on the robustness and no fuse energy gain is obtained. The glass transition temperature/MFFT of the latex composition seems to be dominant in the final robustness and fuse energy consumption. However, the presence of the acetal cosolvent in the ink compositions do not disturb the formed film in the sense that it becomes tacky or rough.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term "combination of the plural", as used herein, is defined as two or more than two.

The invention claimed is:

1. An ink composition comprising:
   1-40 weight % of a latex resin, said latex resin having a minimal film forming temperature (MFFT) of 90° C. or higher;
   0.5-15 weight % of a colorant;
   20-80 weight % of water; and
   1-30 weight % of an acetal cosolvent, wherein the acetal cosolvent is at least one selected from the group consisting of glycerol formal, an alkyl acetal and a linear diether acetal;
   wherein all amounts are relative to the total ink composition.

2. The ink composition according to claim 1, wherein the acetal cosolvent has a molecular structure in accordance with Formula 1

$$R_1\text{—}O\text{—}R_2\text{—}O\text{—}CH_2\text{—}O\text{—}R_3\text{—}O\text{—}R_4 \quad \text{Formula 1}$$

wherein:
$R_1$ and $R_4$ are independently of one another selected from the group consisting of —H, and $C_1$-$C_6$ monovalent alkyl groups;
$R_2$ and $R_3$ are independently of one another selected from the group consisting of $C_2$-$C_6$ alkyl divalent groups.

3. The ink composition according to claim 2, wherein:
$R_1$ and $R_4$ are independently of one another selected from the group consisting of —H, —$CH_3$, —$C_2H_5$, and —$C_3H_7$.

4. The ink composition according to claim 2, wherein:
$R_2$ and $R_3$ are independently of one another selected from the group consisting of —$C_2H_4$—, —$C_3H_6$—, and —$C_4H_8$—.

5. The ink composition according to claim 1, wherein the acetal cosolvent is Bis(2-methoxy-ethoxy)methane.

6. The ink composition according to claim 1, wherein the colorant is a dye, a pigment, a mixture of dyes, a mixture of pigments or a mixture of pigments and dyes.

7. The ink composition according to claim 1, wherein the latex resin is at least one selected from the group consisting of: polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins, and copolymer resins.

8. The ink composition according to claim 1, further comprising 15-75 weight % of a dispersion stabilizing cosolvent.

9. The ink composition according to claim 8, wherein said dispersion stabilizing cosolvent is at least one water soluble organic solvent selected from the group consisting of: polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

10. The ink composition according to claim 1, further comprising a surfactant in an amount of between 0.01 weight % and 3 weight % relative to the total ink composition.

11. The ink composition according to claim 1, wherein the acetal cosolvent is at least one selected from the group consisting of: glycerol-formal; Bis(2-methoxy-ethoxy) methane; and alkyl-acetals.

12. The ink composition according to claim 1, wherein the acetal cosolvent is selected from the group consisting of: glycerol-formal and Bis(2-methoxy-ethoxy)methane, and wherein the acetal cosolvent is present in an amount of between 1 weight % and 20 weight %, relative to the total ink composition.

13. The ink composition according to claim 1, wherein the acetal cosolvent is an alkyl-acetal, which alkyl-acetal is at least one selected from the group consisting of: methylal, ethylal and butylal.

14. The ink composition according to claim 13, wherein the alkyl-acetal is present in an amount of between 1 weight % and 10 weight % relative to the total ink composition.

15. The ink composition according to claim 7, wherein the latex resin is at least one selected from the group consisting of a styrene-acrylate copolymer resin, and a styrene-butadiene copolymer resin.

16. The ink composition according to claim 1, wherein the acetal cosolvent is at least one selected from the group consisting of glycerol formal, and a linear diether acetal.

\* \* \* \* \*